Patented Dec. 9, 1952

2,621,165

UNITED STATES PATENT OFFICE 2,621,165

PHENOL PHTHALALDEHYDE RESINS AND PROCESS OF PREPARING SAME

Lloyd H. Brown, Seattle, Wash., assignor to California Research Corporation, San Francisco, Calif., a corporation of Delaware No Drawing. Application May 23, 1949, Serial No. 94,922

14 Claims. (Cl. 260—53)

The present invention relates to synthetic resins and processes of preparing the same. More particularly, it involves the production of a novel type of phenol-aldehyde resin capable of setting or curing to an insoluble, infusible state at relatively low temperatures.

A problem long existent in the phenol-aldehyde resin art has been the production of low temperature thermosetting resins (resol or resolite type), or of permanently fusible, soluble resins (novolak type), which, upon addition of a setting agent, will cure to infusible, insoluble products at low temperatures. Expensive polyhydric phenols such as resorcin are used at present and have been accepted as satisfactory in the absence of a better solution to the problem. Higher aldehydes have failed to yield low temperature reactive resins, and even dialdehydes such as glyoxal derived from the corresponding 1,2-glycols do not yield the desired low temperature setting characteristics.

An object of this invention is to provide new and valuable synthetic resin products.

An additional object of the present invention is to provide a soluble, fusible phenol-aldehyde resin capable of conversion at relatively low temperatures to an insoluble, infusible product.

Another object is to provide a new process for producing synthetic phenol-aldehyde resins with relatively nonvolatile reactants in a homogeneous single-phase reaction mixture, while avoiding the hazards of dermatitis or formation of volatile reaction products associated with formaldehyde and hexamethyleneamine, respectively, heretofore encountered in phenol aldehyde resin manufacture.

Other objects and advantages of the invention will be apparent from the following disclosure.

It has been discovered that the foregoing objects may be attained by reaction of a phenol with a polyfunctional aldehyde having at least two aldehyde groups separated by at least two carbon atoms. In contrast to dialdehydes derived from 1,2-glycols, such as glyoxal, it has been found that aldehydes in which at least two aldehyde groups are separated by at least two carbon atoms, impart low temperature reactivity to the resins herein disclosed and yield products which can be rapidly set by cross-linking at temperatures substantially lower than attainable with prior-known aldehydic components in phenol aldehyde resins. This discovery makes possible the production of highly reactive, fusible, soluble phenolaldehyde resins capable of conversion to insoluble, infusible products at temperatures even as low as room or below.

The polyfunctional aldehydes utilized may vary widely within the broader aspects of this invention so long as at least two aldehyde groups are separated by at least two carbon atoms. The upper limit in molecular weight of the aldehydes and in the number of carbon atoms separating the aldehyde groups has not been found critical. In general, as the molecular weight of the aldehyde increases beyond 8 carbon atoms, the reactivity tends gradually to decrease. However, the disadvantage of this decreased reactivity is offset for some purposes by increased oil compatibility of the resulting resins, which arises from the greater hydrocarbon to oxygen ratio furnished by the higher polyfunctional aldehydes. This oil compatibility is useful for specialized products as in the production of resin components for oil-base coating compositions. For most practical purposes, the polyfunctional aldehydes utilized herein contain a total of 4 to 18 carbon atoms, where the aldehydic groups are separated by from 2 to 16 carbon atoms. At present polyfunctional aldehydes containing from 4 to 10 carbon atoms are preferred. Likewise, it is preferred that the separating carbon atoms or chain be of hydrocarbon type structure, although nonfunctional substituents are not precluded.

Exemplary polyfunctional aldehydes embodying the principle of this invention may be selected from the aliphatic, cyclo-aliphatic, aromatic and alkyl aromatic series of compounds. By way of illustration, suitable polyfunctional aldehydes are succinaldehyde, adipaldehyde, the octyl dialdehydes such as 1,8-octane di-al, as well as the higher dialdehydes such as the dodecyl, hexadecyl and octadecyl dialdehydes. 1,4-cyclohexyl dialdehyde and 1,3-cyclohexyl dialdehyde are illustrative of the cyclo-aliphatic series of dialdehydes embraced by this invention. It will be apparent to those skilled in the art that other polyfunctional aldehydes containing more than two aldehydic groups separated by at least two carbon atoms and selected from the foregoing series of compounds, are operative.

Although a wide variety of polyfunctional aldehydes may be utilized within the broader scope of the invention, so long as they embody the critical characteristic separation of at least two aldehyde groups by at least two carbon atoms, the aromatic polyfunctional aldehydes are preferred and yield outstanding results in the process and products herein disclosed. Aromatic polyfunctional aldehydes in which the aldehyde groups are directly attached to the aromatic ring, possess relatively high reactivity at low temperatures in the resin compositions of this invention.

When the aldehyde group is attached directly to the resonant aromatic ring the aldehydes seem to possess a higher degree of activity than when attached to nonresonant linkages. This "resonance" theory is taken as an explanation of the high degree of activity of the aromatic polyfunctional aldehydes. We have further discovered that the various isomeric aldehydes of this aromatic type, in turn, differ in reactivity. Terephthalaldehyde is more reactive than isophthalaldehyde, which, in turn, is more reactive than orthophthalaldehyde under representative conditions. Other polyfunctional aromatic aldehydes yielding highly reactive resins as herein disclosed are 1,3,5-benzene trialdehyde and 1,2,4,5-benzene tetraaldehyde. Aromatic aldehydes, in which the aldehyde group is not directly attached to the aromatic ring in general, have properties intermediate the aliphatic and the foregoing aromatic compounds. As previously indicated, increased molecular weight tends gradually to decrease reactivity, but is compensated in some instances by valuable modified solubility properties. This principle is applicable to the alkyl substituted polyfunctional aromatic aldehydes, such as the methyl, ethyl, propyl, butyl, amyl, hexyl, octyl and decyl phthalaldehydes, which may be utilized in this invention for their corresponding specialized properties.

Polyfunctional aldehyde compounds of the diphenyl series, in which the aldehyde groups are on the same ring or on different rings, are, of course, aromatic aldehydes within the scope of this disclosure and capable of yielding highly reactive products. Diphenyl o-o'-dialdehyde is illustrative of this variant.

The phenols as a class react to form phenol-aldehyde type resins and it is equally true that the broad class of phenols is reactive with the polyfunctional aldehydes herein disclosed, to yield valuable reactive resinous products within the scope of this invention. Accordingly polynuclear, mononuclear, substituted, and unsubstituted phenols, are operative to yield resins of this invention. For practical purposes, nononuclear phenols are presently preferred, and, although polyhydric phenols such as resorcin are useful, the invention is regarded as finding its greatest utility in the production of resins with monohydric phenols. Alkyl-substituted phenols such as the cresols, ethyl, propyl, butyl, amyl, hexyl, octyl, decyl, dodecyl, hexadecyl and octadecyl phenols, may be utilized when modified properties are desired. Except when the alkyl substitution is in the meta position, reactivity of the phenol is diminished by an alkyl substituent. Meta-substituted phenols such as meta cresol or its higher alkyl homologs therefore comprise a preferred class of alkyl-substituted phenols. For purposes of simplicity and by reason of its wide applicability, the foregoing class of phenols will be illustrated hereinafter for the most part by phenol itself.

It is to be understood that the present invention is not limited to the production of resins from single aldehydes or single phenols. Mixtures of polyfunctional aldehydes with a phenol, mixtures of phenols with a polyfunctional aldehyde, or mixtures of phenols with mixtures of polyfunctional aldehydes, are contemplated. The advantages and increased reactivity arising from the polyfunctional aldehydes may be imparted to phenol-aldehyde resins either by utilizing a mixture of the polyfunctional aldehyde with a monoaldehyde such as formaldehyde or furfural in the initial formation of the resin or by reaction of polyfunctional aldehydes with a novolak type phenol-formaldehyde or phenol-furfural resin, for example.

The resinous products of this invention may be regarded as of two major types: First, those which are permanently fusible, and permanently soluble (commonly designated novolak type) and, secondly, soluble thermosettable (commonly designated resol type) resins which are capable of conversion to a thermoset product. A wide flexibility in types of products embodying this invention results from the polyfunctionality of the aldehyde component, and variations in the above two major types of resins, therefore, may be attained. Generally speaking, however, the novolak type products are obtained by acid catalysts and the resol type by alkaline catalysts.

In general, the proportion of polyfunctional aldehyde is from 0.4 to 3 mol equivalents per mol of phenol, depending upon the type of resin desired.

The resols are formed by mixing the phenol with the polyfunctional aldehyde and effecting the condensation reaction with an alkaline catalyst. Almost any alkali may be employed, including alkali metal hydroxides, alkaline earth metal hydroxides such as barium or calcium, ammonia, or quarternary ammonium bases. Among the preferred catalysts are barium hydrate, calcium hydroxide, sodium hydroxide and ammonia. Mixed catalysts such as a barium hydroxide ammonia mixture have been found highly effective. From about 2% to about 25% by weight based on the phenol, comprises a suitable proportion of catalyst. Lower proportions of the more active catalysts are advisable. For resol production, from about .7 to 3 mol equivalents of polyfunctional aldehyde per mol of phenol, is utilized. Temperature of the reaction is from about 60° C. to refluxing temperature which usually approximates 100° C.

The term "mol equivalents" as used herein designates the combining weight equivalent to one mol of monoaldehyde. Thus, a mol equivalent of dialdehyde is one-half its molecular weight in grams.

The novolak resins are formed with the polyfunctional aldehydes either without catalysts or with an acid type catalyst. Acid catalysts tend to minimize cross-linking and thereby yield permanently fusible and soluble products. In the production of these novolak resins, from about .4 to .7 mol equivalents of the polyfunctional aldeyde per mol of phenol may be used. Reaction temperatures are similar to those used in the resol formation.

Illustrative of the flexibility of composition types obtainable with polyfunctional aldehydes, in accordance with this invention, is the production of resols by reaction of a conventional novolak produced from monoaldehyde, with a polyfunctional aldehyde. These resols contain both mono- and polyfunctional aldehydes and possess the advantage of increased reactivity, which is characteristic of the products of this invention. Analogous mixed compositions of either the novolak or resol types may be obtained by reaction of phenol with a mixture of monaldehyde with polyfunctional aldehydes. Generally at least about 5%, and more desirable 25% to 35% by weight, of the polyfunctional aldehydes based on the resin should be present. The greater the proportion of polyfunctional aldehyde the greater the reactivity of the resulting product. The total mol equivalents of aldehyde in these mixtures are as previously described.

To illustrate the outstanding advantages and uniqueness of polyfunctional aldehydes having at least two aldehyde groups separated by at least two carbon atoms, comparative curing times are given with a monoaldehyde and a dialdehyde derived from a 1,2-glycol and illustrated by glyoxal:

TABLE I

| Aldehyde | Curing temp. | Curing time | Appearance of product |
|---|---|---|---|
| | °C. | | |
| Terephthalaldehyde | 20 | 1 minute | Amber. |
| Glyoxal | 150 | 30 seconds | Black. |
| $CH_2O$ | 150 | 20 seconds | Amber. |
| Glyoxal | 20 | Infinite | |
| $CH_2O$ | 20 | do | |

The curing times and temperatures given above are for typical one-step resins made from each of the three aldehydes with phenol, in the presence of 10% ammonium carbonate.

Comparative tests of isomeric benzene dialdehydes with phenol

To compare the reactions of the three benzene dialdehydes with phenol, .0075-mol batches of each aldehyde were mixed with .01-mol batches of phenol, with 10% $Ba(OH)_2.8H_2O$, 5% NaOH, and 10% $NH_3$, based on the phenol. The sodium hydroxide and ammonia were added as 5% and 10% aqueous solutions, respectively. Barium hydroxide was used as in the previous example, with alcohol added as the mixture thickened. The mixtures were heated as indicated in Table II.

Effects of proportions of polyfunctional dialdehyde

One-gram batches of phenol were mixed with equal weights of ammonia water containing 5% ammonia. Terephthalaldehyde was added, and the mixtures were heated, as indicated in Table IV.

TABLE IV

| Mols terephthalaldehyde per mol phenol | Reaction temp., °C. | Reaction time, hours | Product | Hardening time in minutes at 150° C. |
|---|---|---|---|---|
| 0.20 | 100 | 3 | Yellow liquid | 1⅔. |
| 0.30 | 100 | 3 | White solid | Only slightly softened. |
| 0.40 | 100 | 7½ | Yellow liquid | 20. |
| 0.50 | 60 | 6⅔ | Orange liquid | 22. |
| | 100 | 1⅓ | | |
| 0.75 | 60 | 6⅔ | do | 25. |
| | 100 | 1⅓ | | |
| 1.00 | 60 | 6⅔ | Orange gel | 19. |
| | 100 | 1⅓ | | |

One-gram batches of phenol were mixed with equal weight of 10% NaOH solution: Terephthalaldehyde was added and the mixtures were heated as indicated in Table V.

TABLE V

| Mols terephthalaldehyde per mol phenol | Reaction temp., °C. | Reaction time, hours | Product |
|---|---|---|---|
| 0.50 | 100 | 6⅙ | Dark gel. |
| 1.00 | 100 | 6½ | Do. |
| 1.50 | 100 | 8 | Dark liquid. |

TABLE II

| | Catalyst | Time heated | Yield | Hardening time 130° | Fusibility | With 10% $(NH_4)_2CO_3$, Hardening Time 130° | Fusibility | Gel time room temperature |
|---|---|---|---|---|---|---|---|---|
| | | Hours | Percent | Minutes | | | | |
| Terephthalaldehyde | Barium hydroxide | 19 | 100 | 5 | Fusible | 45 Sec. | Infusible | 10 min. |
| Isophthalaldehyde | do | 19 | 75.7 | 9 | do | 2½ min. | Fusible | 7 hrs. |
| Orthophthalaldehyde | do | 19 | 30.9 | | Very little residue | | | Did not gel. |
| Terephthalaldehyde | Sodium hydroxide | 2 | 90.8 | 4 | Fusible | 8 min. | Fusible | Ppt. |
| Isophthalaldehyde | do | 2 | 86.6 | 8 | do | 14 min. | do | Ppt. |
| Orthophthalaldehyde | do | 2 | 65.4 | 25 | do | 13 min. | do | Did not gel. |
| Terephthalaldehyde | Ammonia | 1¼ | 50.5 | 18 | do | 5 min. | do | 2 days. |
| Isophthalaldehyde | do | 1¼ | 52.6 | 30 | do | 30 min. | do | Did not gel. |
| Orthophthalaldehyde | do | 1¼ | 51.1 | 8 | do | 4 min. | do | Do. |

Comparative tests of alkaline catalysts

One-gram batches of phenol were mixed with 1.47 g. batches of terephthalaldehyde, and to each mixture was added a gram of an alkaline catalyst solution, the strength of which is indicated in Table III. After mixing, the materials were heated, and resins were formed as indicated.

Acid catalysis

Table VI summarizes the yields, softening points, and solution viscosities of a series of phenol-terephthalaldehyde, -isophthalaldehyde, and $-CH_2O$ resins prepared under as nearly as possible identical conditions. In the dialdehyde

TABLE III

| Aldehyde | Catalyst | Catalyst strength, percent | Temp., °C. | Time, hours | Product |
|---|---|---|---|---|---|
| Terephthalaldehyde | NaOH | 1 | 100 | 8 | Red, viscous liquid. |
| Do | do | 5 | 100 | 6½ | Dark gel. |
| Do | do | 10 | 100 | 3¾ | Do. |
| Do | do | 25 | 100 | 2¾ | Do. |
| Do | $Ba(OH)_2.8H_2O$ | 3 | 100 | 8 | Yellow liquid. |
| Do | do | 5 | 100 | 8 | Liquid. |
| Do | do | 10 | 100 | 8 | Do. |
| Do | do | 15 | 100 | 8 | Dark gel. |
| Do | $NH_4OH$ | 5 | 60 | 6⅙ | Orange gel. |
| Do | do | 20 | 60 | 6⅔ | Do. | resins, the water content was made the same as would be present with CH₂O.

Yields recorded are the weights, in grams, of resin obtained from batches containing 50 g. phenol. Softening points were determined by the copper bar method. Viscosities are Gardner viscosities of 50% solutions in alcohol. Setting time is the time, in minutes, for a mixture of 1.00 g. resin, .100 g. hexamethyleneamine, and .0200 g. Ca(OH)₂ to harden on a hot-plate at 150° C.

In all cases, the ingredients were mixed at room temperature and heated slowly to refluxing temperature. The process of solution of the dialdehyde was endothermic. After refluxing 3 hours and 20 minutes, the resins were vacuum distilled about 35 minutes at temperatures up to 150° C. It was necessary to vary the dehydrating time considerably, as some of the formaldehyde resins were not clear at the end of 35 minutes, and some of the terephthalaldehyde resins were too highly cross-linked to dehydrate that long. As a consequence, considerable low molecular weight material was undoubtedly present in the dialdehyde resins. This explains the lower melting points obtained at the higher dialdehyde usages.

TABLE VI

| Aldehyde/phenol mol ratio | Catalyst | Viscosity | Softening point | Yield (gms.) | Setting time |
|---|---|---|---|---|---|
| | | | Degrees | | Minutes |
| 0.30 terephthalaldehyde | 3% HCl | B | 120 | 50.5 | 14 |
| 0.35 terephthalaldehyde | do | A | 112 | 57.3 | 21 |
| 0.40 terephthalaldehyde | do | B | 105 | 58.9 | 30 |
| 0.30 terephthalaldehyde | 3% oxalic | B | 64 | 21.1 | 11 |
| 0.40 terephthalaldehyde | do | A | 75 | 41.8 | 16 |
| 0.30 isophthalaldehyde | 1% HCl | B | 78 | 38.0 | 15 |
| 0.40 isophthalaldehyde | do | B | 105 | 53.5 | 14 |
| 0.30 isophthalaldehyde | 3% HCl | B | 118 | 49.7 | 24 |
| 0.40 isophthalaldehyde | do | B | 102 | 54.8 | 28 |
| 0.50 CH₂O | do | B | 50 | 38.5 | 65 |
| 0.60 CH₂O | do | A | 64 | 42.1 | 105 |
| 0.70 CH₂O | do | E | 85 | 47.3 | 6 |
| 0.80 CH₂O | do | G | 96 | 51.3 | 4½ |
| 0.90 CH₂O | do | B-stage resin | | | |
| 0.60 CH₂O | 3% oxalic | A | 68 | 41.6 | 4 |
| 0.80 CH₂O | do | I | 105 | 47.7 | 4 |

To illustrate the acid condensation of phenol and terephthalaldehyde at higher aldehyde ratios, 25 g. phenol, 18 g. terephthalaldehyde, .75 g. oxalic acid, and 10 cc. water were heated over a period of 40 minutes to refluxing temperature and held there three hours. An orange color developed. The acid was neutralized with 1.87 g. Ba(OH)₂ and unreacted phenol and terephthalaldehyde were steam distilled off. The resulting soft resin did not harden readily without catalyst at 150° C. On addition of barium hydrate, it became infusible in 10 seconds at that temperature.

The following examples are given to illustrate further the relatively wide variation in process and products attainable by this invention:

EXAMPLE I.—PHENOL TEREPHTHALALDEHYDE RESIN

Phenol (25 g.) was mixed with 2.5 g. of Ba(OH)₂.8H₂O, and heated until the phenol went into solution. Terephthalaldehyde (22.1 g., or .6 mol per mol of phenol) was added at 60° C.; solution was endothermic. The mixture was gradually heated to 100° C., over a period of about 30 minutes, in a three-necked flask equipped with thermometer, stirrer, and reflux condenser, on a boiling water bath. It was kept at reflux temperature 4–10 hours, depending on the desired viscosity. The solution turned red and finally became almost black. Commercial ethyl alcohol was added, as the mixture thickened, until the solids content became 50%. The barium hydrate was neutralized with 1 g. of oxalic acid, whereupon the color became light amber, and the solution was cooled. The resulting varnish hardened almost instantly at room temperature when 10% ammonia, based on the resin, was added. With 15–25% ammonium carbonate, based on the resin, it gelled in 5–20 minutes and became hard on standing overnight.

EXAMPLE II.—SUCCINALDEHYDE PHENOL RESIN

A mixture of 16 grams 2,5-diethoxytetrahydrofuran and 80 cc. of .5 N. HCl was warmed to 33° C., with stirring, over a period of five minutes. Solution was obtained, and it was cooled immediately. Presence of succinaldehyde was confirmed by precipitation of its bisphenylhydrazone from a similarly prepared sample. Phenol (9.4 g., or an equimolar proportion) was added at 12° C., and the mixture was gradually warmed to refluxing over a period of two hours. The phenol went into solution at 56° C., and the color was dark green. Gradually a dark resin precipitated. After two hours at boiling, the HCl was neutralized with 2.0 g. of CaCO₃, and the aqueous layer was decanted. Yield was 15 grams of a dark, tarry resin. This material did not harden in 20 minutes at 100° C., but with 10% ammonium carbonate, it hardened in one minute at that temperature. It became hard on standing overnight at room temperature.

EXAMPLE III.—TEREPHTHALALDEHYDE MODIFIED NOVOLAK TYPE PHENOL-FORMALDEHYDE RESIN

A novolak type phenol-formaldehyde resin was prepared and dehydrated, using ⅔ mol formaldehyde per mol of phenol. This resin (100 g.) was dissolved in commercial ethyl alcohol (25 g.) at 90° C.; barium hydrate (10 g.) was added. At 70–78° C., 35 grams of terephthalaldehyde were slowly dropped in. The temperature was maintained at 80–92° C. five hours, alcohol being cut in gradually as the material thickened until a total of 125 cc. of alcohol had been added. The barium hydrate was neutralized with 4.0 g. oxalic acid, and the mixture was cooled. It was amber colored and very viscous. It reacted rapidly, either at room temperature or at 100° C., with ammonia or ammonia compounds.

Twenty-five grams of the phenol-formaldehyde novolak described in the last paragraph above were dissolved in 25 g. of commercial ethyl alcohol; 8.75 g. terephthalaldehyde and .25 cc. of concentrated HCl were added. The mixture was heated slowly, over a period of an hour, to 84° C., and was held at that temperature two hours. The varnish became somewhat viscous. It was neutralized with dilute KOH solution and the water layer which formed was decanted. The resulting varnish was thickened rapidly at room tempearture by ammonium carbonate.

EXAMPLE IV.—CRESOL POLYFUNCTIONAL DIALDEHYDE RESIN

To illustrate the operability of other phenols in the present invention, an alkyl phenol has been selected for a typical example.

Crystalline barium hydrate, 2.50 g., was added to m-p-cresol (60% meta), 25.0 g., and the mixture was heated until the barium hydrate went into solution. Terephthalaldehyde, 19.2 g. (.6 mol per mol of phenol), was added and the mixture was heated to 100° over a period of 15 minutes. The mixture was kept at reflux temperature 27 hours, alcohol being cut in as the mixture thickened until a solids content of 50% was reached. The resulting dark resinous solution hardened in 1½ minutes at 150° C. Ammonia and its compounds gelled it rapidly at room temperature.

Setting agents

A resin varnish prepared as in the first example above (that is, containing .6 mol terephthalaldehyde per mol of phenol, and prepared with a barium hydroxide catalyst) was mixed in the cold with 10%, based on the total solids, of various nitrogen compounds. Table VII gives the results:

TABLE VII

| Setting agent | Catalyst | Gel time, Minutes | Appearance |
| --- | --- | --- | --- |
| 28% aqueous ammonia | | 1 | Greenish. |
| Do | 5% NaOH | 3 | Dark green. |
| (NH$_4$)$_2$CO$_3$ | | 3 | Light green. |
| Aqueous (NH$_4$)$_2$CO$_3$ | 5% NaOH | 2 | Opaque light green. |
| Do | 20% NaOH | 8 | Dark green. |
| Ethylene diamine-formaldehyde | | 15 | Opaque white. |
| Do | 20% NaOH | | Dark liquid. |
| Do | 1% NaOH | 120 | Greenish white. |
| Hexamethyleneamine | 2% H$_3$BO$_3$ | 5 | Soft orange gel. |
| Diethylene triamine | | (1) | |
| Tetraethylene pentamine | | (1) | |
| Propylene diamine | | (1) | |
| p-Phenylene diamine | | (2) | Orange solid. |

[1] Too fast to mix.
[2] Instantaneous.

It will be observed from the foregoing examples that cold setting was obtained with ammonia, polyamines or equivalent ammonia or polyamine liberating compounds. Examples of additional setting agents of this type are ethylene diamine, propylene diamine, dicyanodiamid, diethylenetriamine, triethylenetetramine, and tetraethylenepentamine. The ammonia polyamine setting agents serve not merely as catalysts, but also enter as actual reactants in the cross-linking and curing stage. Chemical analysis indicates that from one-quarter to one-half mol equivalents of ammonia or polyamines per mol of aldehyde in the resin actually combines therewith. In excess of the ammoniacal, or polyamine setting agents may be used by incorporating up to 10% ammonia based on the resin. Equivalent combining ratios of the other setting agents may be used. Although amounts in excess of said 10% are not precluded, little, if any, advantage is obtained thereby.

The low temperature setting characteristics obtainable with the ammonia compounds and polyamines is attributed to the presence of free aldehyde groups in the soluble resin formed with the polyfunctional aldehydes. Whether or not this theory is correct, the fact remains that phenolaldehyde resins formed by reaction by polyfunctional aldehydes respond differently and set at relatively low temperature with ammonia, whereas monoaldehydes do not yield products with this characteristic.

The utility of the novolak and resol types of products herein disclosed is not limited to cold setting reaction with ammonia and polyamines. The polyfunctional aldehydes, by reason of their high degree of reactivity, yield resinous products which retain the desired fusibility and solubility while developing very desirable high body or viscosity characteristics, both as solutions and in plastic flow of the solid product. These advantageous properties, therefore, are valuable for higher temperature thermosetting reactions, in which the novolak and resol type products are cured at conventional temperatures by usual catalytic agents.

The resins of this invention are of particular utility in those applications where rapid setting at moderate or low temperatures are at a premium. Typical applications involve: use of solutions or dispersions as adhesive compositions, solutions in spirit solvents such as alcohol, acetone or dioxane for impregnating or laminating, as well as in coating compositions and for bonding aggregates such as abrasives into grinding wheels or glass fibers into mats. These resins are particularly adapted to the production of compounds for molding in the production of molding compounds for use at conventional temperatures and pressures. The high bodied characteristic of the type of resin produced herein gives unusual value in developing a high degree of true plastic flow, coupled with complete and rapid cure. In the production of molding compounds using the novolak type of resin in which the common setting agent is hexamethyleneamine, the use of the polyfunctional aldehydes as a setting or cross-linking agent makes it possible to produce thermosetting phenolic molding powders with improved electrical properties due to the fact that there is no ammonia of condensation eliminated and possibly trapped in the finished molded article.

Modifying agents or plasticizers such as phosphate esters (e. g. tricresyl phosphate) may be incorporated in molding compositions with the resins of this invention. The low temperature curing resins of this invention are of unusual value in that products comparable in most physical properties to those of the hot-molded articles can be produced by the common art of cold molding.

In casting resins, the dialdehydes herein utilized, being obtainable in stable anhydrous form and miscible with the phenols, minimize the problem of water inclusion heretofore encountered.

The resins of this invention possess ion-exchange properties and, due to their low temperature setting characteristics, possess distinct advantages in the production of ion-exchange media.

To further illustrate the utility of the invention and preparation of compositions for particular applications of the resinous compositions disclosed, the following examples are given:

EXAMPLE V.—IMPREGNATING AND LAMINATING VARNISH—BARIUM HYDRATE CATALYZED RESIN

Phenol (25 g.) was mixed with 2.5 g. of

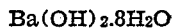

and heated until the latter went into solution. Terephthalaldehyde (22.1 g., or .6 mol per mol of phenol) was added at 60° C.; solution was endothermic. The mixture was gradually heated in a three-necked flask equipped with stirrer, thermometer, and reflux condenser, on a water bath. It was kept at reflux temperature for 8–10 hours, depending on the desired viscosity of the product. The solution turned dark red. Commercial ethyl alcohol was added as the mixture thickened, until a resin solids of 50% was attained. The barium hydrate was neutralized with 1 g. of oxalic acid, and the solution was cooled. The resulting varnish hardened almost instantly when 10% ammonia, based on the resin, was added. With 15–25% ammonium carbonate, based on the resin, it gelled in 5–20 minutes and became hard, but slightly brittle, on standing overnight. With 5–20% EDF (ethylene diamine-formaldehyde), paper-based laminates were impregnated and cured at 100° C. in 10 minutes.

When a molding powder rather than a laminating varnish is desired, the proportions for preparation of the resin are similar to those given above, but after a short heating period, without addition of solvent, the barium hydrate is neutralized and the resin is dehydrated. Very little dehydration is necessary; the only water present is that formed by condensation.

EXAMPLE VI.—QUICK SETTING ADHESIVE—NaOH-CATALYZED RESINS

Phenol (25 g.) was mixed with NaOH solution (1 g. in 9 cc. of water), and 36.7 g. terephthalaldehyde (1 mol per mol of phenol) was added gradually. The mixture was heated in a boiling water bath as in the previous example. It turned red; in about an hour it became slightly tacky. After three hours, 10 cc. of alcohol was added. The solution turned deep blue. Alcohol was added gradually as the mixture thickened. After 15 hours' heating, an additional 9.2 g. (¼ mol per mol of phenol) of terephthalaldehyde was added. The solution was refluxed another 16 hours. It was then a viscous, purple liquid at 50% solids. It hardened in one minute with 10% ammonia, based on the resin solids, in the cold. The resulting solution is a good quick-setting adhesive for cold assembly of wooden parts. Fillers such as wood or walnut shell flour may be added if desired.

EXAMPLE VII.—AMMONIA-CATALYZED RESINS SUITABLE FOR WOOD ADHESIVE AND MOLDING POWDERS 17.6 g. of 28% ammonia water were added slowly to a mixture of 50 g. phenol and 36.8 g. terephthalaldehyde (½ mol per mol of phenol). An exothermic reaction took place at room temperature. After an hour, the mixture was slowly warmed to 60° C. over a period of 45 minutes. An additional 18.4 g. terephthalaldehyde were added after two hours at that temperature, and two hours later, 5.4 g. of ammonia water were poured in. After another 45 minutes, vacuum distillation was started; it was continued 45 minutes at temperatures up to 117° C. Some free phenol was still coming over, but the mixture was quite stiff. It was poured and allowed to cool. The product was an amber colored, brittle resin. The yield was 69 g.

The foregoing resin dissolved readily in alcohol on warming, but precipitated out when cool. A few per cent of ethanolamine, aniline, or furfuryl alcohol rendered the solutions clear at room temperature. These resin solutions reacted rapidly with ammonia compounds even at room temperature.

A 60% solution of the above resin in alcohol was mixed with 35% ammonium carbonate, 5% furfuryl alcohol, and 15% walnut shell flour, and the resulting adhesive was used for assembling wood laminates, 100% wood failure was obtained after clamping overnight. That is, the bond was stronger than the wood. The glue line was light yellow in color, which is a distinct advantage over resorcin-formaldehyde adhesives.

To produce a molding powder, this resin is compounded with a filler such as alpha cellulose flock or asbestos fiber and with an ammonia liberating catalyst such as hexamethyleneamine.

Reactivity of the resins of this invention with compounds containing basic nitrogen has been noted hereinbefore in connection with ammonia and amine setting agents. This reactivity with basic nitrogen-containing compounds opens a field of utility in the treatment of various natural and synthetic materials containing basic nitrogen. For example, the resols herein disclosed contain residual or reactive aldehyde groups and are valuable treating agents for protein-containing materials such as leather or casein. The reactive aldehyde groups of the resins herein disclosed combine with proteins of casein to effect a cross-linking action and with the basic nitrogen groups of leather to modify and improve its physical properties, as in tanning treatments. This application of the resin in tanning also may be effected by resin formation in situ. Thus, basic nitrogen groups of leather or of polyamine resins may be reacted first with dialdehydes disclosed herein, e. g. terephthalaldehyde and, when desired, a phenol thereafter reacted with any free or reactive residual aldehyde groups of the initial product formed with the dialdehyde. The leather treated with dialdehyde alone possesses modified and improved properties and, accordingly, is useful as such.

Although this invention has been illustrated with numerous variations in process and products, further alterations utilizing the principles thereof will occur to those skilled in the art. For example, polyfunctional aldehydes useful for the purposes of this invention may be obtained and prepared by linkage of two monoaldehydic compounds with each other or through a single bridging compound to obtain a resulting dialdehyde; for instance, halogenated monoaldehydes such as chloroacetaldehyde (or its equivalent dimethyl acetal or other dialkyl acetals thereof) may be condensed with a difunctional bridging compound by reaction with the chlorine atom of the acetaldehyde. A suitable difunctional bridging compound for the foregoing is of the type Na—O—R—O—Na, where R is dimethylene or any other suitable glycol-forming radical. In this specific illustration the reaction and dialdehyde product will be:

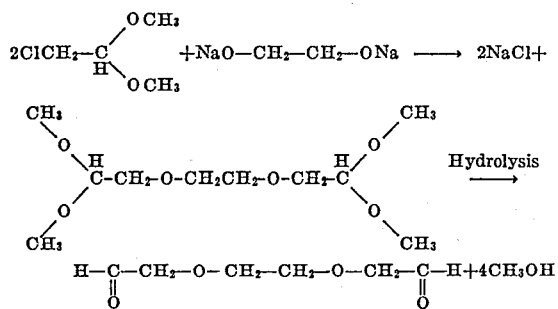

It is to be understood that the invention is not limited to the specific examples, and may be otherwise embodied or practiced within the scope of the appended claims.

I claim:

1. A synthetic resin consisting of the reaction product obtained by condensing a phenol selected from the group consisting of phenol, polyhydric phenols, alkyl substituted phenols, and mixtures thereof, with a benzene dialdehyde.

2. A syntehtic resin consisting of the reaction product obtained by condensing a phenol selected from the group consisting of phenol, polyhydric phenols, alkyl substituted phenols, and mixtures thereof, with a benzene dialdehyde, said aldehyde being present in the amount of about 5% to 35% by weight based on said synthetic resin.

3. A thermosetting phenol aldehyde resin consisting of the reaction product obtained by condensing a phenol selected from the group consisting of phenol, polyhydric phenols, alkyl substituted phenols, and mixtures thereof, with from about 0.7 to 3 mol equivalents of a benzene dialdehyde per mol of phenol in the presence of an alkaline condensation catalyst.

4. A fusible, soluble phenol aldehyde resin consisting of the reaction products obtained by condensing a phenol selected from the group consisting of phenol, polyhydric phenols, alkyl substituted phenols, and mixtures thereof, with from about 0.4 to 0.7 mol equivalents of a benzene dialdehyde per mol of phenol in the presence of an acid condensation catalyst.

5. A process of preparing a synthetic resin which comprises condensing a material consisting of a phenol selected from the group consisting of phenol, polyhydric phenols, alkyl substituted phenols, and mixtures thereof, with from about 0.4 to 3 mol equivalents of a benzene dialdehyde per mol of phenol, said condensation being effected at a temperature of from about 60° to 100° C.

6. A process of preparing a thermosetting phenol aldehyde resin which comprises condensing a material consisting of a phenol selected from the group consisting of phenol, polyhydric phenols, alkyl substituted phenols, and mixtures thereof, with from about 0.7 to 3 mol equivalents of a benzene dialdehyde per mol of phenol, said condensation being effected at a temperature of from about 60° to 100° C. in the presence of an alkaline condensation catalyst.

7. A process of preparing a fusible, soluble phenol aldehyde resin which comprises condensing a material consisting of a phenol selected from the group consisting of phenol, polyhydric phenols, alkyl substituted phenols, and mixtures thereof, with from about 0.4 to 0.7 mol equivalents of a benzene dialdehyde per mol of phenol, said condensation being effected at a temperature from about 60° to 100° C. in the presence of an acid condensation catalyst.

8. A synthetic resin consisting of the reaction product obtained by condensing a phenol selected from the group consisting of phenol, polyhydric phenols, alkyl substituted phenols, and mixtures thereof, with from about 0.4 to about 3 mole equivalents of a benzene dialdehyde per mole of phenol, said condensation being effected at a temperature of from about 60° C. to 100° C.

9. A thermosetting phenol aldehyde resin consisting of the reaction product obtained by condensing a phenol selected from the group consisting of phenol, polyhydric phenols, alkyl substituted phenols, and mixtures thereof, with from about 0.7 to 3 mole equivalents of a benzene dialdehyde per mole of phenol in the presence of an acid condensation catalyst, said condensation being effected at a temperature of from about 60° C. to 100° C.

10. A fusible, soluble phenol aldehyde resin consisting of the reaction product obtained by condensing a phenol selected from the group consisting of phenol, polyhydric phenols, alkyl substituted phenols, and mixtures thereof, with from about 0.4 to 0.7 mole equivalents of a benzene dialdehyde per mole of phenol in the presence of an acid condensation catalyst, said condensation being effected at a temperature of from about 60° C. to 100° C.

11. A synthetic resin, according to claim 8, wherein the benzene dialdehyde is terephthalaldehyde.

12. A synthetic resin, according to claim 8, wherein the benzene dialdehyde is isophthalaldehyde.

13. A synthetic resin, according to claim 8, wherein the benzene dialdehyde is orthophthalaldehyde.

14. A process of setting the resin defined in claim 8 which comprises reacting said resin with ammonia.

LLOYD H. BROWN.

REFERENCES CITED

The following references are of record in the file of this patent:

UNITED STATES PATENTS

| Number | Name | Date |
|---|---|---|
| 2,390,153 | Kern | Dec. 4, 1945 |
| 2,478,154 | Evans | Aug. 2, 1949 |

FOREIGN PATENTS

| Number | Country | Date |
|---|---|---|
| 468,746 | Great Britain | July 8, 1937 |